United States Patent
Zhu et al.

(10) Patent No.: US 12,206,241 B2
(45) Date of Patent: Jan. 21, 2025

(54) REDUNDANT POWER SUPPLY, IN PARTICULAR FOR DATA CENTERS, AND METHOD AND COMPUTER PROGRAM FOR THE OPERATION THEREOF

(71) Applicant: Siemens Aktiengesellschaft, Munich (DE)

(72) Inventors: Yi Zhu, Kümmersbruck (DE); Shivansh Batra, Schwieberdingen (DE); Thomas Beckert, Nuremberg (DE); David Meulenbroeks, Utrecht (NL)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/910,748

(22) PCT Filed: Apr. 27, 2022

(86) PCT No.: PCT/EP2022/061183
§ 371 (c)(1),
(2) Date: Sep. 9, 2022

(87) PCT Pub. No.: WO2022/233673
PCT Pub. Date: Nov. 10, 2022

(65) Prior Publication Data
US 2024/0204518 A1     Jun. 20, 2024

(30) Foreign Application Priority Data
May 3, 2021 (DE) .................. 10 2021 204 439.5

(51) Int. Cl.
*H02J 3/00*       (2006.01)
*H02H 3/08*      (2006.01)

(52) U.S. Cl.
CPC ............ *H02J 3/0012* (2020.01); *H02H 3/08* (2013.01); *H02J 3/0073* (2020.01)

(58) Field of Classification Search
CPC ......... H02J 3/0012; H02J 3/0073; H02H 3/08
See application file for complete search history.

(56) References Cited

U.S. PATENT DOCUMENTS 6,433,444 B1    8/2002 de Vries
9,081,568 B1    7/2015 Ross et al.
(Continued)

FOREIGN PATENT DOCUMENTS

| EP | 1890371 A1 | 2/2008 |
| EP | 3293851 A1 | 3/2018 |
| EP | 3605776 A1 | 2/2020 |

*Primary Examiner* — Lincoln D Donovan
*Assistant Examiner* — Alex W Lam
(74) *Attorney, Agent, or Firm* — Schmeiser, Olsen & Watts LLP

(57) ABSTRACT

A redundant power supply has a first power supply, which is disconnectedly connected to a busbar by means of a first tie switch and is connectable to a first load without a tie switch, and having a second power supply, which is disconnectedly connected to the busbar by means of a second tie switch and is connectable to the first load without a tie switch, and having a third power supply, which is disconnectedly connected to the busbar by means of a third tie switch and is connectable to a second load without a tie switch, and having a fourth power supply, which is disconnectedly connected to the busbar by means of a fourth tie switch and is connectable to the second load without a tie switch. All of the tie switches are closed during trouble-free operation.

11 Claims, 1 Drawing Sheet

(56) References Cited

U.S. PATENT DOCUMENTS

| | | |
|---|---|---|
| 2005/0273207 A1 | 12/2005 | Dougherty |
| 2009/0033153 A1* | 2/2009 | Linkhart .................. H02J 9/06 307/64 |
| 2014/0191579 A1 | 7/2014 | Szu |
| 2015/0378408 A1 | 12/2015 | Kaplan |
| 2017/0033595 A1* | 2/2017 | Mandarino ............... H02J 3/38 |

* cited by examiner

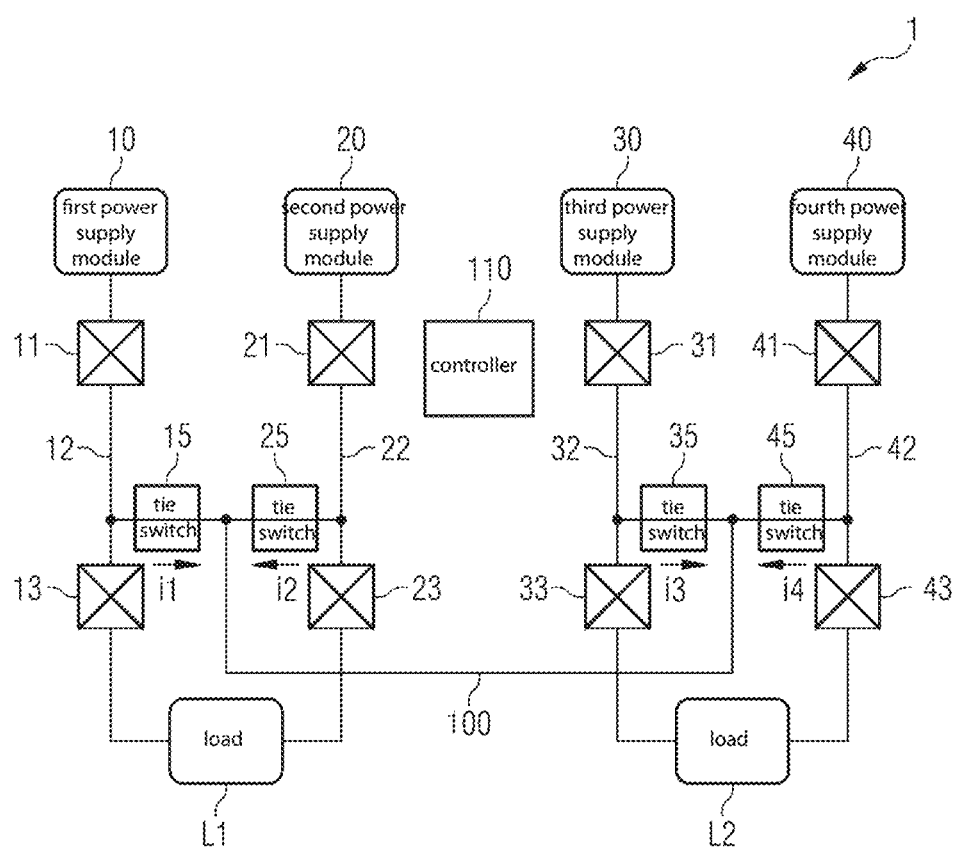

ing from leading to an interruption in the supply of power to the critical load assigned to the applicable emergency power generator. This system is also very complex, both mechanically and in terms of circuitry.

REDUNDANT POWER SUPPLY, IN PARTICULAR FOR DATA CENTERS, AND METHOD AND COMPUTER PROGRAM FOR THE OPERATION THEREOF

CROSS-REFERENCE TO RELATED APPLICATIONS

This application claims priority to PCT Application No. PCT/EP2022/061183, having a filing date of Apr. 27, 2022, which claims priority to DE Application No. 10 2021 204 439.5, having a filing date of May 3, 2021, the entire contents both of which are hereby incorporated by reference.

FIELD OF TECHNOLOGY

The following relates to a redundant power supply that is in particular suitable for data centers.

BACKGROUND

Data centers and other critical electrical facilities are required to continue operating without restriction even if elementary components such as the power supply fail. In many cases, the power supply is therefore designed redundantly. Such a system, already expanded to include a generator and a local uninterruptible power supply, is known from US 2014/0191579 A1. A critical component of a data center is supplied with power by way of two independent power supplies. In order to ensure operation of the critical component even if one of the power supplies fails, both power supplies need to be dimensioned in such a way that each of the power supplies can reliably supply power to at least the critical component on their own. To put it another way, each power supply needs to be designed in such a way that it can bear twice the load compared to the undisturbed case. This is very uneconomical, since designing the power supply for this rare disturbance case leads to a considerable increase in the price of the individual power supplies.

U.S. Pat. No. 6,433,444 B1 discloses a system with N+2 redundancy for the power supplies that is in particular suitable for electrical facilities having high power consumption, such as entire buildings. By way of example, three critical electrical facilities are redundantly supplied with power by a total of three regular and two alternative power supplies, or six critical facilities are redundantly supplied with power by a total of six regular and two alternative power supplies. Very complex circuitry ensures that if one regular power supply fails, a first alternative power supply is used, and if another regular power supply or the first alternative power supply fails, the second power supply is used.

A somewhat different approach, a so-called "isolated-parallel rotary diesel UPS system", is disclosed in EP 1 890 371 A1. In this instance, a unified power supply grid supplies power to multiple essential and multiple critical electrical loads and there is provision for multiple diesel-operated emergency power supplies that take over the supply of power to the critical loads if the unified power supply fails. There is provision for flywheels as temporary kinetic energy stores in this case, which deliver electrical energy via a generator after the power supply has failed until the internal combustion engines of the emergency power generators have been started using the kinetic energy of the flywheels. The emergency power generators are coupled by means of an electrical bus system that is intended to prevent a combustion engine that does not start or does not start in time from leading to an interruption in the supply of power to the critical load assigned to the applicable emergency power generator. This system is also very complex, both mechanically and in terms of circuitry.

SUMMARY

An aspect relates to specify an improved redundant power supply.

In other words, embodiments of the invention ensures that, in the undisturbed operating state of the power supply, each load is supplied with power directly (apart from the usual safety precautions such as line and switch disconnectors, fuses, etc.) by two power supplies and is additionally coupled to the power supplies of the other load(s) via tie switches and a busbar.

This interconnection of the two subsystems, which may fundamentally also be operated independently of one another and each consist of two power supplies and a load, advantageously means that each power supply does not need to be capable of operating the load on its own (as is the case in US 2014/0191579 A1, for example). Specifically, in the event of failure of (or maintenance work on) the first power supply, for example, the redundant second power supply does not need to take over the task of the first power supply on its own, but rather, due to the tie switches that are switched on during trouble-free operation, that is to say by default, the first load is supplied with power not only by the second but also by the third and fourth power supplies, without assistance, after the first power supply is removed.

An advantage of this for the design of the power supplies is that each power supply need not be designed for twice (200%) the load to be borne during normal operation, but rather only for 133%, since the power lost if one power supply fails can be delivered by three power supplies. As mentioned, this advantageously takes place without assistance, i.e. without operator intervention and without changing the switching position of one of the elements in the current path, that is to say without any time delay.

Furthermore, the redundant power supply ensures an even load on the power supplies, in particular in periods in which one load consumes less power than the other load (or in the extreme case is switched off), specifically likewise without assistance. This has advantages with regard to the cooling of the power supplies, for example, since the power loss is (more) evenly distributed over all four power supplies (and thus spatially).

Of course, the concept according to embodiments of the invention may be expanded to include further power supplies and loads, advantageously in the form of further subsystems, each consisting of two power supplies and one load, that may be connected to the busbar by means of tie switches, which further reduces the load to be additionally borne by the remaining power supplies if one power supply fails, or means that, if the design of the power supplies remains the same, failures of more than one power supply may also be intercepted.

In particular, a controller may be provided to handle other (rarer) fault cases than the failure of one of the power supplies. This controller may be central or distributed, or local, for example in one or more tie switches.

One possible fault case is disturbance of the busbar, for example a short circuit or conductor fault. If such a disturbance is detected, the tie switches are opened.

Another possible fault case is disturbance, again just a short circuit or conductor fault, for example, of a line coming from a power supply, that is to say for example the line between one of the power supplies and the tie switch connected to the power supply, or in the event of a disturbance on the line between one of the power supplies and the load connected to the power supply without a tie switch. These may be the same line, at least in part, or a branch at which these two lines end. This fault case is handled by opening the tie switch connected to the power supply in question.

To allow better detection of the aforementioned fault cases, there may be provision for the tie switches to comprise means for determining the current flowing through the respective tie switch and/or the arithmetic sign of the current flowing through the respective tie switch and means for transferring a current value and/or an arithmetic sign value to the controller. As already mentioned, the controller may also be arranged centrally for this purpose or distributed over the individual tie switches.

Furthermore, in further refinements of embodiments of the invention, the power supplies comprise means for generating a signal that indicates whether the respective power supply is active or inactive, and means for transmitting this signal to the controller.

The (central or distributed) controller receives the current values and/or arithmetic sign values from all of the tie switches and optionally the signals from all of the power supplies and recognizes a busbar disturbance if the sum of all of the current values delivered by the tie switches exceeds a threshold value and/or all of the tie switches deliver arithmetic sign values that indicate a flow of current from the respective power supply to the busbar.

Following recognition of such a busbar disturbance, all of the tie switches are opened, as explained above. Of course, threshold values for the current values may be defined and/or threshold values from which a tie switch outputs a specific arithmetic sign, with the result that tolerable (transient or permanent) effects do not lead to the tie switches being switched off.

Likewise, the controller may be designed to factor in the time response and to recognize the fault case, or to initiate measures, only when the described state lasts for a defined and/or configurable period of time. In this case, the period of time may be selected according to the level of the current flowing away in the direction of the busbar disturbance, or of the electrical power flowing away thereto, with shorter periods of time advantageously being selected for high powers flowing away.

The method described may also be used to detect so-called low-level faults, i.e. faults that cause fault currents that cannot be detected by conventional local short-circuit or fault current detectors because they cannot be distinguished locally from a permissible loading case.

Faults that occur in the line system to be assigned to an individual power supply may also be detected in a similar manner. For this purpose, the aforementioned signals are also evaluated and disturbance of the line system that can be assigned to a power supply is identified if all of the power supplies signal that they are active and the current value at one of the tie switches corresponds to the negative value of the sum of the current values of all of the other tie switches and/or if the arithmetic sign value of a tie switch is opposite to the arithmetic sign values of all of the other tie switches.

Following recognition of such a disturbance, the tie switch in question is opened, as explained above. Of course, threshold values for the current values may also be defined for this fault case, and/or threshold values from which a tie switch outputs a specific arithmetic sign, with the result that tolerable, in particular transient, effects do not lead to the tie switches being switched off. These threshold values may differ from or be consistent with the threshold values used for the busbar disturbance.

Again, the controller may be designed to factor in the time response and to recognize the fault case, or to initiate measures, only when the described state lasts for a defined and/or configurable period of time. In this case, the period of time may be selected according to the level of the current flowing away in the direction of the line system in question, or of the electrical power flowing away thereto, with shorter periods of time advantageously being selected for high powers flowing away. The periods of time may also differ from or be consistent with the periods of time used for the busbar disturbance.

Embodiments of the present invention also relates to a method for operating a redundant power supply according to embodiments of the invention and to a computer program that causes a processor to carry out this method.

BRIEF DESCRIPTION

Some of the embodiments will be described in detail, with reference to the following FIGURE, wherein like designations denote like members, wherein:

FIG. 1 shows a schematic representation of a redundant power supply 1 to which two loads L1 and L2 are connectable, according to an exemplary embodiment of the present invention; the redundant power supply 1 may be viewed as the interconnection of two basically known subsystems by means of a busbar 100 and tie switches 15, 25, 35, 45.

DETAILED DESCRIPTION

The first subsystem, on the left in FIG. 1, comprises a first power supply module 10 and a second power supply module 20. The first power supply module 10 is connected to a first line system 12 by means of a source-side fuse device 11. The source-side fuse device 11 is a commercially available fuse device.

The second power supply module 20 is connected to a second line system 22 by means of a source-side fuse device 21. The source-side fuse device 21 is a commercially available fuse device.

A first load L1 is connected to the first line system 12, specifically by means of a load-side fuse device 13. The load-side fuse device 13 is also a commercially available fuse device.

The first load L1 is likewise connected to the second line system 22, specifically by means of a load-side fuse device 23. The load-side fuse device 23 is also a commercially available fuse device.

The second subsystem, on the right in the illustration, comprises a third power supply module 30 and a fourth power supply module 40, which are connected to a corresponding third and fourth line system 32, 42 via respective source-side fuse devices 31, 41. A second load L2 is connected both to the third and to the fourth line system 32, 42 by way of applicable load-side fuse devices 33, 43.

As already explained, there is provision according to embodiments of the invention for tie switches 15, 25, 35, 45 in order to connect the two subsystems to a busbar 100. A busbar is generally understood here to mean a possibly multipolar rigid or flexible line, which, in particular, does not necessarily have to be in the form of a rail.

A first tie switch 15 connects the first line system 12 to the busbar 100, a second tie switch 25 connects the second line system 22 to the busbar 100, a third tie switch 35 connects the third line system 32 to the busbar 100 and a fourth tie switch 45 connects the fourth line system 42 to the busbar 100. This means that each power supply module is coupled to a load directly, that is to say without a tie switch, and to the busbar 100 by means of a tie switch. The loads are in turn each connected to the busbar 100 via a tie switch. It goes without saying that both the line systems 12, 22, 32, 42 and the busbar 100 may have one or more poles.

Considering the example of the first power supply 10, the first load L1 is thus connected to the first power supply 10 without a tie switch, via line system 12, and the first power supply is connected to the busbar, likewise via line system 12, by means of the first tie switch 15. This allows the first power supply 10 to deliver power to the second load L2 via the first line system 12, the first tie switch 15 and the busbar 100 if required, namely by means of the third and/or the fourth tie switch 35, 45 and the third and/or the fourth line system 32, 42. In addition, there is an alternative supply route to the first load L1 via the second tie switch 25 and the second line system 22, for example in the event that the supply line to the first load L1, which is protected by the load-side fuse device 13, is disturbed.

In order to achieve this, the tie switches 15, 25, 35, 45 are all closed during normal operation. It is not important for embodiments of the present invention whether the power supply modules 10, 20, 30, 40 deliver DC or AC voltage. However, it goes without saying that the rated voltages of the power supply modules in the two subsystems must be at least approximately the same and that, in the case of AC voltage, phase synchronism must exist in order to avoid undesirable effects. Alternatively, it is of course also possible to couple two asynchronous AC systems by means of a DC voltage busbar and the applicable rectifiers and inverters, in which case systems with different operating voltages may also be coupled.

As already explained above, embodiments of the present invention provide significant advantages for the design of the power supply modules 10, 20, 30, 40. In addition, an expansion to include further subsystems is possible without any problems and it is also conceivable to provide an odd number of power supply modules. In the present description, reference has been made to so-called subsystems only because such subsystems are often already found in existing installations and can be converted into a redundant power supply according to embodiments of the present invention at low cost. This expressly does not entail a restriction of embodiments of the invention to the coupling of two subsystems.

However, consideration of the subsystems makes it easier to understand an important advantage of embodiments of the present invention. The expansion of an existing redundant system, for example a data center, is considered in this case. A first subsystem will generally already be present here, with the usual design of the power supply modules such that each of the power supply modules is able to supply power to the load of the first subsystem on its own. If a second subsystem is now intended to be installed, the first subsystem is simply expanded to include two branches on the line systems and the tie switches and then connected to the new busbar—no further changes are required and the (now actually oversized) power supply modules can continue to be used or may be replaced by more efficient modules as needed.

In the exemplary embodiment shown, the redundant power supply 1 also comprises a controller 110, the function of which is described in detail below. As already discussed, the controller may be in central form or decentralized, i.e. distributed over other components, for example the tie switches 15, 25, 35, 45. For the sake of clarity, the signal and/or command lines required in some cases between the power supply modules and the controller and/or between the tie switches and the controller or between the tie switches have not been shown.

Two operating scenarios (meaning faultless operation) and three fault scenarios are particularly relevant for the power supply system shown in the FIGURE, and these will be considered below.

The first operating scenario may be described as follows: all four power supply modules 10, 20, 30, 40 have approximately the same electrical performance parameters and function correctly, and the two loads L1, L2 have approximately the same electrical performance parameters and function correctly with approximately the same power consumption. Virtually no currents i1, i2, i3, i4 then flow through the tie switches 15, 25, 35, 45 (indicated by appropriate arrows in the FIGURE), i.e. $i1=i2=i3=i4=0$. The instantaneous values of the currents are considered here. The direction of the currents i1, i2, i3, i4 is defined for the present consideration, without limiting the generality, such that there is a positive value when the current flows from the line system 12, 22, 32, 43 to the busbar 100 and conversely there is a negative value when the current flows from the busbar 100 to the respective line system 12, 22, 32, 42.

The second operating scenario is distinguished from the first operating scenario in that the power consumption of the first load L1 is (significantly) lower than the power consumption of the second load L2, for example the first load L1 consumes only 70% of its rated power, while the second load L2 consumes 100% of its rated power.

In this case, equalizing currents flow from the first subsystem to the second subsystem via the busbar 100, more precisely from the first power supply 10 and the second power supply 20 to the second load L2, where: $i1=i2=-i3=-i4$.

The first fault scenario has already been discussed above and relates to the failure or maintenance of a power supply module. Without limiting the generality, the case will be considered that the first power supply module 10 is not available or the source-side fuse device 11 is defective or has tripped due to a fault and, as a result, no energy can be supplied to the first line system 12 from the first power supply module 10.

As also already discussed, this fault scenario is resolved without assistance by virtue of applicable equalizing currents flowing from the remaining power supply modules 20, 30, 40 to the first load L1, where: $i1=-(i2+i3+i4)$. From the point of view of the first load L1, the failure of the first power supply module 10 is completely transparent: the electrical power continues to be routed via the redundant power supply paths of the first load L1 and can be demanded by the load L1 from both power supply paths equally, as in the trouble-free case. There is no switching delay at all, since the tie switches are closed and the equalizing currents flow to the first load L1 via the busbar 100 and the tie switches 15, 25 immediately after the first power supply module is removed.

The second fault scenario relates to a disturbance on the busbar. In this disturbance case, more current or power flows into the busbar than is drawn from elsewhere, that is to say $i1+i2+i3+i4>0$ or, for many practical applications, $i1+i2+i3+i4>iS$, where iS is a definable threshold value, with the result that operation is seen as still normal as long as this threshold value is not exceeded.

In order to also be able to detect this fault scenario when the disturbance does not result in current values of such level that each tie switch can itself decide, i.e. locally, that there is a disturbance such as a short circuit or conductor fault on the busbar 100, exemplary embodiments of the present invention involve a self-test signal being generated by each power supply module and output to the controller 110. A positive self-test signal indicates that the respective controller is active and functioning properly. In addition, the instantaneous value of the current is measured by each tie switch, that is to say i1 ... i4, and a signal representing this value is transferred to the controller 110.

The controller 110 evaluates the received signals and recognizes a disturbance if the criteria already briefly mentioned above are met, i.e. if positive self-test signals are received from all of the power supply modules and the sum of the current values exceeds a threshold value. In particular, the criterion that the sum of the current values exceeds a threshold value is used to differentiate this second fault scenario from the two operating scenarios and the first fault scenario, because both in the two operating scenarios and in the first fault scenario it holds that the sum of the instantaneous values of the currents amounts to at least approximately zero, that is to say is below the threshold value iS.

This fault recognition also works when the redundant power supply 1 is in the second operating scenario, i.e. the two loads L1 and L2 have different power consumptions, and it also works when the second fault scenario arises in addition to the first fault scenario.

In an alternative exemplary embodiment of the present invention, simpler tie switches are used that, rather than determining the instantaneous current value, merely determine a current direction, or, to put it another way, determine the arithmetic sign of the current flowing through the respective tie switch.

The second fault scenario may then be recognized by evaluating the arithmetic sign. The fault case exists if all of the arithmetic signs delivered by the tie switches are the same. However, recognition of the second fault scenario with these simpler tie switches is possible only if the two loads L1 and L2 have at least approximately the same power consumption, but this is still advantageous compared to the case in which the fault is not recognized at all. Alternatively, as already indicated, there may be provision for the tie switches to output an arithmetic sign value only when the absolute value of the current flowing exceeds a specific threshold value implemented in the tie switch by means of hardware or software.

If the second fault scenario is detected, the controller 110 causes all of the tie switches to open, as a result of which the faulty busbar 100 is isolated. In addition, an alarm may be output to an operator.

The third fault scenario is that a disturbance occurs in one of the line systems 12, 22, 32, 42 that can be assigned to the individual power supply modules while all four power supply modules 10, 20, 30, 40 are working correctly, that is to say if a disturbance occurs in the line section between the first power supply 10 and the first tie switch 15 and/or in the line section between the first power supply 10 and the first load L1, for example. As a result of this disturbance, a current or electrical power flows away on the first line system 12, which leads to equalizing currents due to the closed tie switches, where: i1=−(i2+i3+i4).

This is consistent with the first fault scenario, with the difference that in the first fault scenario the first power supply module 10 is not working correctly and this is signalled to the controller 110, or the signal from the first power supply module 10 representing trouble-free operation is not received by the controller 110 in the first scenario. In the third fault scenario, this negative signal is present, or the positive signal is not present, and so the controller 110 can distinguish the first from the third fault scenario and can initiate the measure already described in principle above, namely isolating the first line system 12 by opening the first tie switch 15. In addition, an appropriate alarm may be output to an operator. Furthermore, there may additionally be provision for the controller 110 to send a disconnect command to the source-side fuse device 11 and the load-side fuse device 13 of the first line system 12 in order to completely isolate the fault location.

In exemplary embodiments of the present invention, the methods described above are used to detect so-called low-level faults, i.e. faults that cannot be detected, or at least cannot be reliably detected, by conventional, locally implementable trip criteria. Conventional, locally recognizable trip criteria mean in particular: the instantaneous current value exceeds a maximum current value (this situation is hereinafter referred to as a high-level fault) or the current-time response has a characteristic that is above a trip criterion, for example the sufficiently well known evaluation of $I^2 t$ (this situation is hereinafter referred to as a moderate-level fault).

On the other hand, evaluating the instantaneous current values and/or the arithmetic signs of the current in all four tie switches 15, 25, 35, 45 allows low-level faults to be detected that result in a flow of current below the tripping thresholds of the high-level detectors and the moderate-level detectors and cannot be distinguished from normal operating state changes, for example caused by an operational reduction or increase in the power consumption of a load L1, L2, locally, that is to say for example by one of the tie switches on its own. This applies in particular to low-level faults with a comparatively high impedance between two phases in an AC system.

It is particularly advantageous to combine high-level fault recognition, moderate-level fault recognition and low-level fault recognition, for example by means of appropriately designed tie switches. Such tie switches have locally implemented high-level fault recognition, for example means for comparing the instantaneous current value with a configurable or fixed maximum value. Such high-level fault recognition systems are known to those skilled in the art and afford the advantage that they can be switched off very quickly and in particular without delay as a result of arithmetic operations, and consequential damage can thus be avoided. A typical high-level fault is a short circuit.

Furthermore, such tie switches have moderate-level fault recognition, for example in the form of a tripping curve. This may be implemented completely locally in the tie switch, and many electromechanical or electrothermal implementations are known therefor. Alternatively, if measured current values for the low-level fault recognition are determined in the tie switch anyway and transferred to the controller 110, the tripping curve may also be implemented electronically by tie switches and the central or decentralized controller by virtue of the evaluation of the measured current values over time being performed by the controller, which is advantageous in particular when, as in the exemplary embodiment shown, a central controller controls multiple tie switches. In other words, the moderate-level fault recognition may be combined with the low-level fault recognition.

From application to application, it is necessary to consider whether preference should be given to an accordingly more complex controller, which needs to monitor at least four channels, or to accordingly more complex tie switches. A typical moderate-level fault is, for example, an inadmissibly long-lasting excessive flow of current between the two subsystems, for example caused by a detected and handled fault according to the third fault scenario in combination with excessive power consumption in the affected subsystem with simultaneously very low power consumption in the other subsystem.

In addition to the high-level fault recognition and the moderate-level fault recognition, low-level fault recognition is implemented as described in detail above, which involves a central controller 110 or a controller distributed over the individual tie switches, for example, recording the measured current values of all of the tie switches, alternatively the arithmetic signs of the flows of current through all of the tie switches, and evaluating them using the methods described. This may be combined with the moderate-level fault recognition.

In exemplary embodiments of the present invention, electronic switches are used as tie switches, so-called solid-state circuit breakers (abbreviation SSCB, sometimes also SCCB) being particularly desirable. The use of electronic switches has the advantage that the opening of the tie switches and thus the isolation of faults can take place so quickly that tripping of the usual protective means 11, 13, 21, 23, 31, 33, 41, 43 due to the fault (which would lead to functional restrictions) is avoided. In more general terms, in exemplary embodiments, the tripping characteristic of the tie switches is selected to be faster than the tripping characteristic of the source-side protective devices 11, 21, 31, 41 and/or than the tripping characteristic of the load-side protective devices 12, 23, 33, 43.

In exemplary embodiments, it is possible to arrive at a situation in which the tie switch(es) to be switched are switched in accordance with the detailed description above before one or more power supply module(s) are inadmissibly loaded due to a fault, for example too high a current is demanded for too long a time, and/or before a load does not receive the required electrical power due to a fault, for example the supply voltage drops below the minimum permissible value. The aforementioned criteria, that is to say loading a power supply module with too high a current and/or supplying a load with too low a voltage, possibly additionally in consideration of a time for which the respective critical state lasts, can be used as alternative or additional switching criteria for switching the tie switches.

It should be pointed out that embodiments of the present invention entails a certain amount of implementation effort, but this should be worthwhile in most cases, because only embodiments of the present invention enables the use of significantly smaller power supply modules (as already explained, the power supply modules need only be designed for 133% of the normal load, compared to 200% of the normal load in the case of isolated subsystems that are not equipped according to embodiments of the invention). At the same time, all relevant fault scenarios can be detected in good time, and the faults automatically isolated, in such a way that operation of the loads L1, L2 is not impaired. In addition, the respective fault can be remedied by a maintenance team without the loads L1, L2 having to be switched off for this purpose. In addition, plenty of maintenance work can be done without switching off the loads L1, L2, for example maintenance work on the power supply modules 10, 20, 30, 40, maintenance work on the line systems 12, 22, 32, 42, maintenance work on the fuse devices 11, 13, 21, 23, 31, 33, 41, 43 and maintenance work on the busbar 100, since all of these elements can be de-energized by selectively opening the tie switches 15, 25, 35, 45 and, if necessary, selectively switching off one of the power supply modules, without the supply of power to the loads L1, L2 being interrupted.

It should also be pointed out again that only the minimum configuration has been described in detail here and expansion to include further subsystems is possible without any problems. Incomplete subsystems are also conceivable, that is to say for example the connection of a further load with only one additional power supply module, so that for example five power supply modules supply power to three loads (not shown).

It should be pointed out that the exemplary embodiments described above may be combined with one another as desired. It should also be pointed out that the term "controller" as used here includes processors and processing units in the broadest sense, that is to say for example general-purpose processors, graphics processors, digital signal processors, application-specific integrated circuits (ASICs), programmable logic circuits such as FPGAs, discrete analog or digital circuits and any combination thereof, including any other processing units known to those skilled in the art or developed in future. Processors may consist of one or more devices. When a processor consists of multiple devices, these may be configured to process instructions in parallel or sequentially.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A redundant power supply comprising:
a first power supply, which is disconnectably connected to a busbar by means of a first tie switch and is connectable to a first load without a tie switch;
a second power supply, which is disconnectably connected to the busbar by means of a second tie switch and is connectable to the first load without a tie switch;
a third power supply, which is disconnectably connected to the busbar by means of a third tie switch and is connectable to a second load without a tie switch;
a fourth power supply, which is disconnectably connected to the busbar by means of a fourth tie switch and is connectable to the second load without a tie switch;
wherein all of the tie switches are closed during trouble-free operation; and
a controller that controls the tie switches in such a way that all of the tie switches are opened when a busbar disturbance is detected;
wherein:
the tie switches comprise means for determining the current flowing through the respective tie switch and/or the arithmetic sign of the current flowing through the respective tie switch and means for transferring a current value and/or an arithmetic sign value to the controller;
the controller comprises means for receiving the current values and/or arithmetic sign values from all of the tie switches; and
the controller comprises means for identifying a busbar disturbance if the sum of the current values received from all of the tie switches is greater than a definable threshold value and/or arithmetic sign values that indicate a flow of current from the respective power supply to the busbar are received from all of the tie switches.

2. The redundant power supply as claimed in claim 1, wherein the controller, in an event of a disturbance on the line between one of the power supplies and the tie switch connected to this power supply or in the event of a disturbance on the line between one of the power supplies and the load connected to this power supply without a tie switch, opens the tie switch connected to this power supply.

3. The redundant power supply as claimed in claim 2, wherein:
the tie switches comprise means for determining the current flowing through the respective tie switch and/or the arithmetic sign of the current flowing through the respective tie switch and means for transferring a current value and/or an arithmetic sign value to the controller;
the power supplies comprise means for generating a signal that indicates whether the respective power supply is active, and means for transmitting this signal to the controller;
the controller comprises means for receiving the current values and/or arithmetic sign values from all of the tie switches and means for receiving the signals from all of the power supplies; and
the controller comprises means for identifying a disturbance on the line between one of the power supplies and the tie switch connected to the power supply or a disturbance on the line between one of the power supplies and the load connected to the power supply without a tie switch in response to signals being received from all of the power supplies indicating that the respective power supply is active and that the current value at one of the tie switches corresponds to the negative value of the sum of the current values of all of the other tie switches and/or the arithmetic sign value at one of the tie switches corresponds to the negative value of the arithmetic sign values of all of the other tie switches.

4. A method for operating a redundant power supply as claimed in claim 1, comprising:
for each tie switch, determining the current flowing through the respective tie switch and/or the arithmetic sign of the current flowing through the respective tie switch; and
identifying a busbar disturbance if the sum of the current values received from all of the tie switches is greater than a definable threshold value and/or arithmetic sign values that indicate a flow of current from the respective power supply to the busbar are received from all of the tie switches.

5. The method as claimed in claim 4, further comprising:
for each power supply, generating a signal that indicates whether the respective power supply is active;
identifying a disturbance on the line between one of the power supplies and the tie switch connected to the power supply or a disturbance on the line between one of the power supplies and the load connected to the power supply without a tie switch in response to signals being received from all of the power supplies indicating that the respective power supply is active and that the current value at one of the tie switches corresponds to the negative value of the sum of the current values of all of the other tie switches and/or that the arithmetic sign value at one of the tie switches corresponds to the negative value of the arithmetic sign values of all of the other tie switches.

6. The method as claimed in claim 4, additionally comprising the following steps:
opening all of the tie switches in response to the identification of a busbar disturbance; and/or
opening the tie switch whose current value corresponds to the negative value of the sum of the current values and/or the arithmetic sign value of which corresponds to the negative value of the arithmetic sign values of all of the other tie switches in response to the identification of a disturbance on the line between one of the power supplies and the tie switch connected to the power supply or of a disturbance on the line between one of the power supplies and the load connected to the power supply without a tie switch.

7. A computer program comprising non-transitory machine-readable instructions for implementing the method as claimed in claim 4.

8. A computer program product, comprising a non-transitory computer readable hardware storage device having computer readable program code stored therein, said program code executable by a processor of a computer system to implement the method of claim 4.

9. A redundant power supply comprising:
a first power supply, which is disconnectably connected to a busbar by means of a first tie switch and is connectable to a first load without a tie switch;
a second power supply, which is disconnectably connected to the busbar by means of a second tie switch and is connectable to the first load without a tie switch;
a third power supply, which is disconnectably connected to the busbar by means of a third tie switch and is connectable to a second load without a tie switch;
a fourth power supply, which is disconnectably connected to the busbar by means of a fourth tie switch and is connectable to the second load without a tie switch;
wherein all of the tie switches are closed during trouble-free operation; and
a controller that, in an event of a disturbance on the line between one of the power supplies and the tie switch connected to this power supply or in the event of a disturbance on the line between one of the power supplies and the load connected to this power supply without a tie switch, opens the tie switch connected to this power supply;
wherein:
the tie switches comprise means for determining the current flowing through the respective tie switch and/or the arithmetic sign of the current flowing through the respective tie switch and means for transferring a current value and/or an arithmetic sign value to the controller;
the controller comprises means for receiving the current values and/or arithmetic sign values from all of the tie switches; and
the controller comprises means for identifying a busbar disturbance if the sum of the current values received from all of the tie switches is greater than a definable threshold value and/or arithmetic sign values that indicate a flow of current from the respective power supply to the busbar are received from all of the tie switches.

10. The redundant power supply as claimed in claim 9, wherein:
the tie switches comprise means for determining the current flowing through the respective tie switch and/or the arithmetic sign of the current flowing through the respective tie switch and means for transferring a current value and/or an arithmetic sign value to the controller;

the power supplies comprise means for generating a signal that indicates whether the respective power supply is active, and means for transmitting this signal to the controller;

the controller comprises means for receiving the current values and/or arithmetic sign values from all of the tie switches and means for receiving the signals from all of the power supplies; and the controller comprises means for identifying a disturbance on the line between one of the power supplies and the tie switch connected to the power supply or a disturbance on the line between one of the power supplies and the load connected to the power supply without a tie switch in response to signals being received from all of the power supplies indicating that the respective power supply is active and that the current value at one of the tie switches corresponds to the negative value of the sum of the current values of all of the other tie switches and/or the arithmetic sign value at one of the tie switches corresponds to the negative value of the arithmetic sign values of all of the other tie switches.

11. A method for operating a redundant power supply, the redundant power supply comprising a first power supply, which is disconnectably connected to a busbar by means of a first tie switch and is connectable to a first load without a tie switch, a second power supply, which is disconnectably connected to the busbar by means of a second tie switch and is connectable to the first load without a tie switch, a third power supply, which is disconnectably connected to the busbar by means of a third tie switch and is connectable to a second load without a tie switch, and a fourth power supply, which is disconnectably connected to the busbar by means of a fourth tie switch and is connectable to the second load without a tie switch, wherein all of the tie switches are closed during trouble-free operation, the method comprising:

for each tie switch, determining the current flowing through the respective tie switch and/or the arithmetic sign of the current flowing through the respective tie switch; and identifying a busbar disturbance if the sum of the current values received from all of the tie switches is greater than a definable threshold value and/or arithmetic sign values that indicate a flow of current from the respective power supply to the busbar are received from all of the tie switches.

* * * * *